May 13, 1952    J. A. FRISCHMANN ET AL    2,596,477
LIFT TRUCK GRAB ARM MECHANISM FOR CYLINDRICAL BODIES
Filed Jan. 21, 1949                                        2 SHEETS—SHEET 1
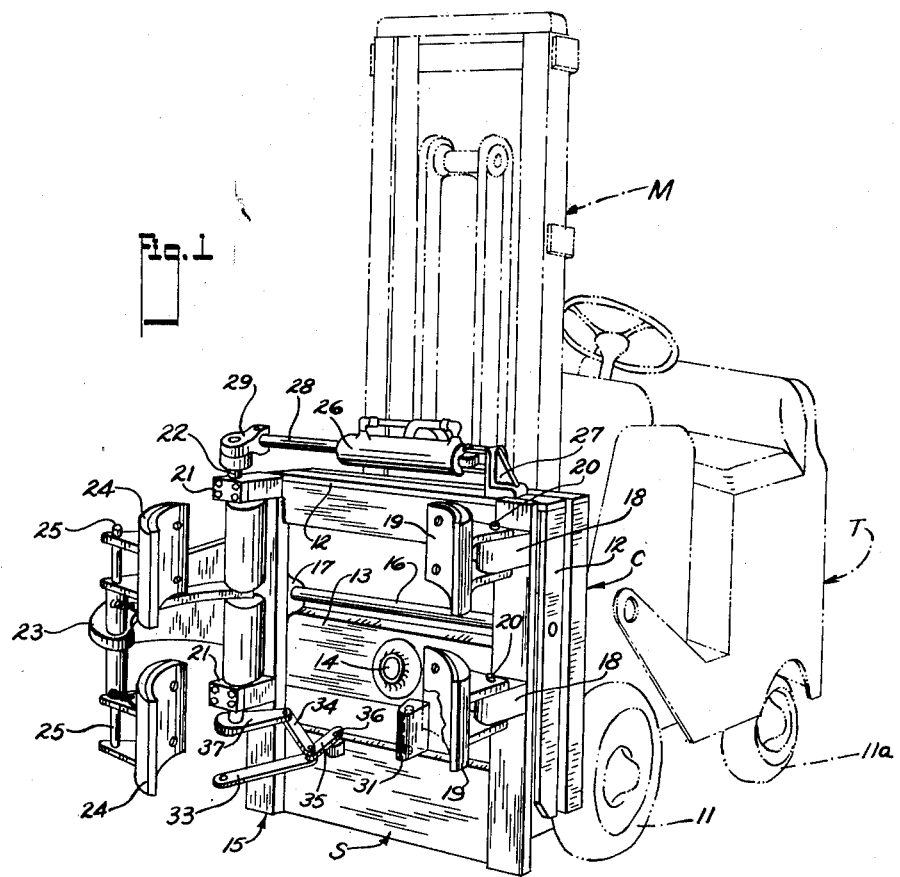
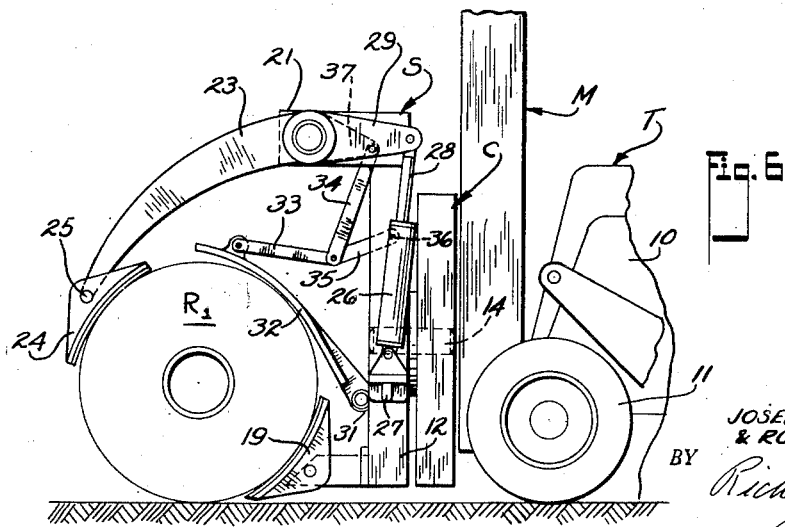
INVENTOR.
JOSEPH A. FRISCHMANN
& ROBERT F. OSTER
BY
*Richey & Watts*
ATTORNEYS May 13, 1952  J. A. FRISCHMANN ET AL  2,596,477
LIFT TRUCK GRAB ARM MECHANISM FOR CYLINDRICAL BODIES
Filed Jan. 21, 1949  2 SHEETS—SHEET 2
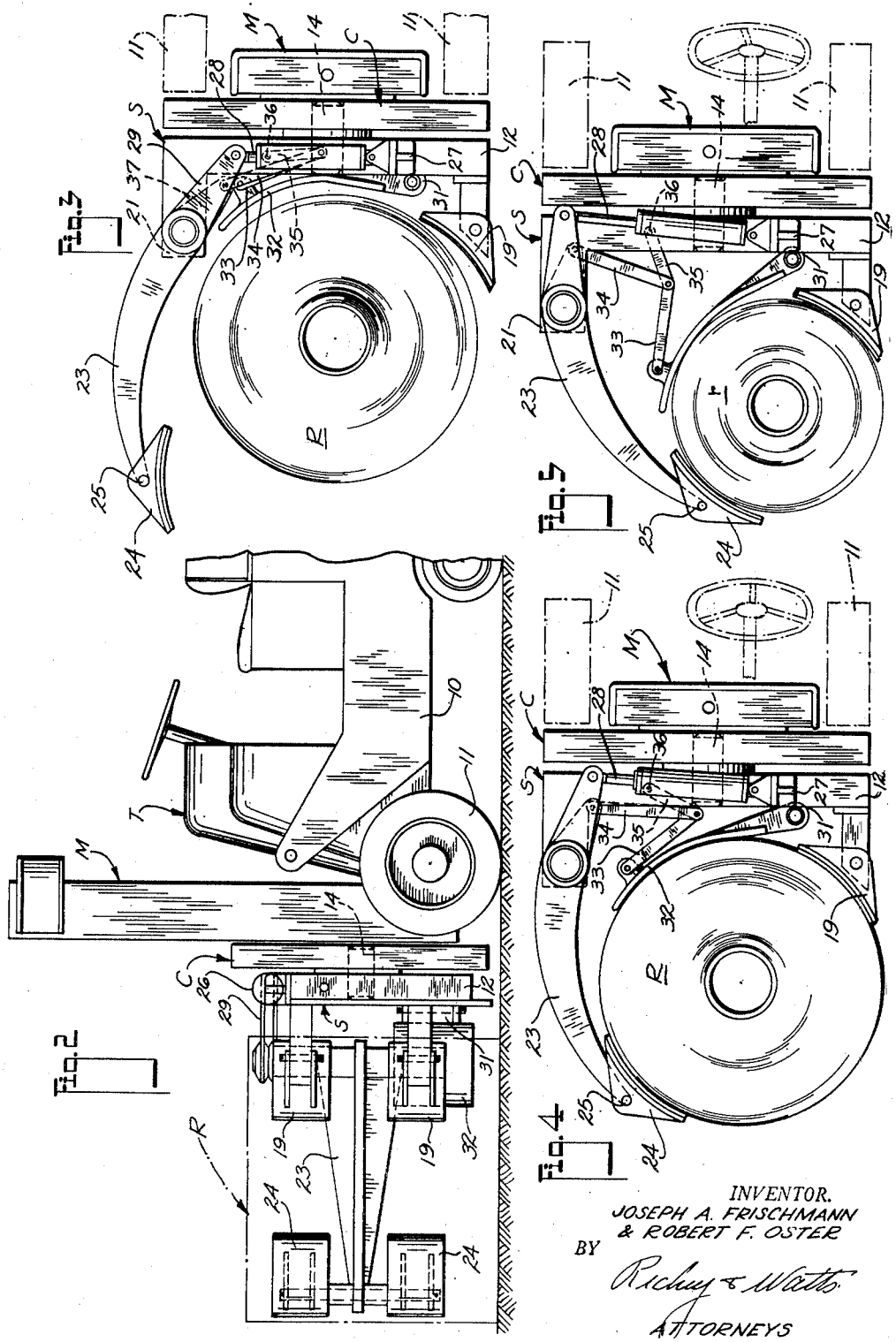
INVENTOR.
JOSEPH A. FRISCHMANN
& ROBERT F. OSTER
BY
*Richey & Watts*
ATTORNEYS Patented May 13, 1952

2,596,477

UNITED STATES PATENT OFFICE 2,596,477

LIFT TRUCK GRAB ARM MECHANISM FOR CYLINDRICAL BODIES

Joseph A. Frischmann and Robert F. Oster, Cleveland, Ohio, assignors to Towmotor Corporation, Cleveland, Ohio, a corporation of Ohio Application January 21, 1949, Serial No. 71,932

6 Claims. (Cl. 214—66)

This invention relates generally to material-handling equipment and, more specifically, to apparatus for gripping and transporting heavy objects such as rolls of paper, drums, and similar cylindrical bodies.

Heretofore the elevating carriage of the conventional lift truck has been provided with an auxiliary supporting structure having a set of opposed gripping shoes mounted thereon arranged to clamp or grip the object to be carried. When operating a lift truck so equipped the operator manipulates the vehicle to a position rearward of the load with the gripping shoes disposed in straddled relation thereto, then closes the shoes upon the side wall of the cylindrical body. With such devices considerable skill upon the part of the operator is necessary in order to assure the proper engagement of the shoes with the load. If the truck is positioned too far rearwardly of the load, improper bearing of the shoes against the cylindrical wall will result. Likewise, if the truck is advanced too far beyond the axis of the cylinder the inner ends of the shoes will engage the cylinder and improper gripping will occur.

The primary object of the present invention is to provide mechanism which will assure the proper orientation of the load and gripping shoes without the exercise of dexterity or skill on the part of the operator. In a preferred form of the invention this is accomplished through the provision of an auxiliary backing shoe mounted between the gripping shoes for forward motion that occurs simultaneously with the closing of the gripping shoes. With this construction the only obligation upon the operator is to see that the cylindrical body is disposed well within the gripping shoes. In fact, he may advance the truck until the backing shoe engages the load with which the latter shoe effects the orientation of the load with the axis of the gripping shoes.

One of the features of the invention resides in the provision of a roll grab mechanism which will automatically compensate for variation in the diameter of the cylindrical body. This is accomplished through linkage which will cause the backing shoe to move in a direction normal to the line of action of the gripping shoes. Thus a relatively small cylinder may be engaged by the backing shoe with the side-gripping shoes fully separated but as the latter shoes are brought together the backing shoe will move forward and shift the load or truck into aligned relation with the axis of the fulcrum on the gripping shoes.

Other objects reside in providing a backing shoe mechanism having the aforesaid mode of operation that can be readily installed on existing load-gripping apparatus and in forming a structure that is simple in design and economic of manufacture.

The manner in which the aforesaid objects and advantages are accomplished by the invention will be understood from the following detailed description of a preferred embodiment thereof.

In the drawings:

Fig. 1 is a perspective view of the apparatus with a portion of the backing shoe assembly removed in the interest of clarity;

Fig. 2 is a side elevation of the apparatus in position to grip the load;

Fig. 3 is a plan view showing the apparatus positioned to grip a load of large dimension, the gripping shoes being disposed in their distended position;

Fig. 4 is a view similar to Fig. 3 showing the shoes in load-gripping position;

Fig. 5 is a view similar to Fig. 4 showing the shoes in gripping relation with a load of smaller diameter; and Fig. 6 illustrates the disposition of the parts of the apparatus when the gripping mechanism is revolved through an angle of ninety degrees.

The gripping apparatus is mounted on a mobile lift truck T having a chassis 10, front drive wheels 11 and rear dirigible wheels 11a. Such trucks are well known in the material-handling art and are generally equipped with a mast M and an elevating carriage C, the structural details of which form no part of the present invention. The load-gripping and -carrying structure is mounted on an auxiliary supporting member S which is generally of rectangular configuration and may include side and top rails 12 and a central cross rail 13. The latter is pivotally mounted on the carriage C by a trunnion 14, it being understood that any suitable mounting structure well known in the art may be employed.

The supporting structure for the load-gripping shoes employed herein is mounted on a rectangular sub-frame 15 pivotally suspended from a cross-rod 16 by blocks 17. Two sets of gripping shoes are provided, and in the preferred form one set of shoes is fixed whereas the other set is mounted to swing toward and away from the stationary set. The fixed shoe assemblies are mounted on brackets 18, the shoes 19 being formed with ears which are drilled for the reception of pivot pins to accommodate the oscillatory movement thereof.

The movable shoes are supported on brackets 21 on the opposite side of the frame S, the brackets being machined for the retention of a vertically disposed shaft 22. A rigid arm 23 is keyed to the shaft, and the shoes 24 are mounted for pivotal movement thereon through the pins 25.

The arm 23 is actuated by a hydraulic piston cylinder assembly 26 which is mounted on an angle plate 27 on the frame S. The piston rod 28 of the cylinder assembly is pinned to a crank arm 29 keyed to the operating shaft 22. Suitable hydraulic connections and control valves are provided for actuating the movable shoes, as is well known in the art.

As will be seen in Fig. 1, a bracket 31 is mounted on the supporting structure S for the retention of a backing shoe member 32. The shoe itself has been removed in Fig. 1, but is clearly illustrated in the remaining figures in the drawings. The backing shoe or buffer is actuated by a toggle which includes a link 33 pivoted to the shoe, an actuating ling 34, and a rod 35 pivoted to the supporting structure and to links 33 and 34 through a pin 36. The actuating link 34 is operated by a crank arm 37 affixed upon the lower end of the shaft 22.

The invention may be advantageously used in handling heavy rolls of paper or so-called newsprint stock, each of which weigh well over a thousand pounds. Such rolls are generally placed on end during storage, as illustrated in Figs. 2 to 5. In manipulating the rolls when so positioned, the rotatable support for the shoes is adjusted to present the arcuate faces thereof to the side wall of the roll with the shoe 32 fully retracted. The operator then advances the truck until the roll R is well within the shoes, or against the backing shoe. Only slight dexterity is required in this operation, as the apparatus will correctly position the roll or shift the forward end of the truck when the backing shoe abuts the roll. With the roll positioned as in Fig. 3 the piston 28 may be extended to move the shoe 24 against the roll. Simultaneously, the toggle and link assembly 33, 34, and 35 will cause the backing shoe 32 to move forwardly in a direction substantially normal to the line of action of the movable shoe. The proportions of the toggle linkage and the disposition thereof are arranged so that, irrespective the diameter of the roll, the gripping shoes will reach their load-engaging position at the same time that the backing shoe has positioned the load so that its axis lies between the gripping shoes.

In Fig. 5 the device is illustrated in gripping engagement with a roll r of a smaller diameter. It will be readily recognized by comparing this figure with Fig. 4 that the backing shoe will center the roll and thus avoid mutilation or inadequate support thereof, as would occur if the backing roll were omitted from the assembly. After the load is firmly engaged by the shoes, the carriage C may be elevated and the supporting structure S rotated through an angle of ninety degrees, as shown in Fig. 6. The roll may be picked up or discharged while lying on its side or standing on end, and may be transported in either position.

It will be seen that material-handling apparatus made in accordance with the foregoing disclosure eliminates the need for precise manipulation of the truck by the operator, and facilitates handling cylindrical bodies of variable size without danger of insecure engagement of the shoes with the side wall thereof.

Although the foregoing description is necessarily of a detailed character, in order that the invention may be completely set forth, it is to be understood that the specific terminolgy is not intended to be restrictive or confining, and that various rearrangements of parts and modifications of detail may be resorted to without departing from the scope or spirit of the invention as herein claimed.

We claim:

1. Roll grip mechanism for use in a lift truck comprising a support member adapted to be mounted on a lift truck, a pair of grip shoe members, means mounting one of said grip shoe members on said support member for motion toward and away from the other shoe member, a backing shoe between said grip shoes and disposed adjacent said support member, means pivotally mounting said backing shoe between said grip shoes for motion generally perpendicular to the line of motion of said one grip shoe, actuating means for said one grip shoe, and toggle link means coupling said backing shoe to said actuating means and to said support structure to cause said backing shoe to move forwardly as said one grip shoe approaches the other.

2. In combination in a lift truck, a chassis, a generally vertical mast carried forwardly of said chassis, a carriage slidable along said mast, means to elevate said carriage, a support member pivotally mounted on said carriage about a generally horizontal axis perpendicular to the plane of the mast, a fixed roll grip jaw mounted on said support member at one side thereof, a grip jaw on the other side of said support member mounted for motion toward said fixed jaw, said movable grip jaw being a substantial distance forward of said fixed jaw, means to move said lever to cause said movable jaw to move toward and away from said fixed jaw, and means to rotate said support member from one position wherein said jaws are at the sides of said carriage to another position wherein said fixed jaw is adjacent the bottom of said carriage, said fixed jaw being rearward of the axis of a roll gripped by said jaws and said movable jaw being forward of said axis with said two jaws gripping and supporting the roll substantially on its diameter, whereby a roll disposed between the jaws may be deposited lengthwise on the floor, with said fixed jaw adjacent the floor.

3. In combination in a lift truck, a chassis, a generally vertical mast carried forwardly of said chassis, a carriage slidable along said mast, means to elevate said carriage, a support member pivotally mounted on said carriage about a generally horizontal axis, a fixed roll grip jaw mounted on said support member at one side thereof, a lever pivotally mounted on the other side of said support member, a movable roll grip jaw on the forward end of said lever, said movable grip jaw being a substantial distance forward of said fixed jaw, means to move said lever to cause said movable jaw to move toward and away from said fixed jaw, a backing shoe between said grip shoes and disposed adjacent said support member, means connected to said lever moving means to move said backing shoe generally perpendicular to the line of motion of said movable grip shoe and simultaneously with motion of said grip shoe, said last-named means being arranged to cause said backing shoe to move forwardly as said movable grip shoe approaches the fixed shoe; said lever, lever moving means, and backing shoe moving means being arranged to cause load-engaging face portions of said backing shoe and of said grip shoes to define a circle the diameter of which passes substantially through the load-engaging face portions of said grip shoes, and means to rotate said support member from one position wherein said jaws are at the sides of said carriage to another position wherein said fixed jaw is adjacent the bottom of said carriage, said fixed jaw being rearward of the axis of a roll gripped by said jaws with said support member rotated to said other position whereby a roll disposed between the jaws may be deposited lengthwise on the floor.

4. In combination in a lift truck, a chassis, a generally vertical mast carried forwardly of said chassis, a carriage slidable along said mast, means to elevate said carriage, a pair of grip shoe members, means mounting one of said grip shoe members on said support member for motion toward and away from the other, a backing shoe between said grip shoes and disposed adjacent said support member, means connected to said lever moving means to move said backing shoe generally perpendicular to the line of motion of said movable grip shoe and simultaneously with motion of said grip shoe, said last-named means being arranged to cause said backing shoe to move forwardly as said movable grip shoe approaches the fixed shoe, said lever, lever moving means, and backing shoe moving means being arranged to cause load-engaging face portions of said backing shoe and of said grip shoes to define a circle the diameter of which passes substantially through the load-engaging face portions of said grip shoes.

5. In combination in a lift truck, a chassis, a generally vertical mast carried forwardly of said chassis, a carriage slidable along said mast, means to elevate said carriage, a support member pivotally mounted on said carriage about a generally horizontal axis perpendicular to the plane of the mast, a pair of relatively short arms extending from opposite sides of said support member, a fixed roll grip jaw pivotally mounted on one of said arms, a lever pivotally mounted on the other of said arms and extending a substantial distance forward of its pivot, a movable roll grip jaw pivotally on the forward end of said lever, hydraulic piston and cylinder means connected to said lever, and means to rotate said support member from one position wherein said jaws are at the sides of said carriage to another position wherein said fixed jaw is adjacent the bottom of said carriage, said fixed jaw being rearward of the axis of a roll gripped by said jaws and said movable jaw being forward of said axis with said two jaws gripping and supporting the roll substantially on its diameter, whereby a roll disposed between the jaws may be deposited lengthwise on the floor, with said fixed jaw adjacent the floor.

6. In combination in a lift truck, a chassis, a generally vertical mast carried forwardly of said chassis, a carriage slidable along said mast, means to elevate said carriage, a support member pivotally mounted on said carriage about a generally horizontal axis, a pair of relatively short arms extending from opposite sides of said support member, a fixed roll grip jaw pivotally mounted on one of said arms, a lever pivotally mounted on the other of said arms and extending a substantial distance forward of its pivot, a movable roll grip jaw pivotally on the forward end of said lever, hydraulic piston and cylinder connected to said lever, means to rotate said support member from one position wherein said jaws are at the sides of said carriage to another position wherein said fixed jaw is adjacent the bottom of said carriage, said fixed jaw being rearward of the axis of a roll gripped by said jaws with said support member rotated to said other position whereby a roll disposed between the jaws may be deposited lengthwise on the floor, a backing shoe disposed between said arms, means pivotally mounting said backing shoe on said support member adjacent said one fixed arm, and linkage means connecting said backing shoe to said lever for simultaneous forward motion as the lever moves to grip an object.

JOSEPH A. FRISCHMANN.
ROBERT F. OSTER.

REFERENCES CITED

The following references are of record in the file of this patent:

UNITED STATES PATENTS

| Number | Name | Date |
|---|---|---|
| 1,377,973 | Weber | May 10, 1921 |
| 1,900,569 | Lederer | Mar. 7, 1933 |
| 2,287,469 | Cochran | June 23, 1942 |
| 2,448,124 | Roy | Aug. 31, 1948 |
| 2,457,366 | Guerin | Dec. 29, 1948 |
| 2,475,367 | Avery | July 5, 1949 |
| 2,488,767 | Drott et al. | Nov. 22, 1949 |
| 2,497,118 | Ferrario et al. | Feb. 14, 1950 |
| 2,522,128 | Lehmann | Sept. 12, 1950 |